US008380518B2

(12) United States Patent
Kim et al.

(10) Patent No.: US 8,380,518 B2
(45) Date of Patent: Feb. 19, 2013

(54) DEVICE, METHOD, AND MEDIUM FOR GENERATING AUDIO FINGERPRINT AND RETRIEVING AUDIO DATA

(75) Inventors: Hyounggook Kim, Yongin-si (KR); Yuan Yuan She, Beijing (CN); Kiwan Eom, Seoul (KR); Xuan Zhu, Beijing (CN); Jiyeun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1442 days.

(21) Appl. No.: 11/598,134

(22) Filed: Nov. 13, 2006

(65) Prior Publication Data

US 2007/0112565 A1 May 17, 2007

(30) Foreign Application Priority Data

Nov. 11, 2005 (KR) ........................ 10-2005-0108070

(51) Int. Cl.
*G10L 23/00* (2009.01)
*G10L 19/02* (2006.01)
*H03M 13/00* (2006.01)
(52) U.S. Cl. ........ 704/273; 205/231; 205/243; 205/270; 369/59.1
(58) Field of Classification Search .................. 704/205, 704/231, 243, 270; 369/59.1
See application file for complete search history.

(56) References Cited

U.S. PATENT DOCUMENTS

| 6,971,013 | B2 * | 11/2005 | Mihcak et al. ................ 713/180 |
| 6,990,453 | B2 | 1/2006 | Wang et al. |
| 7,110,338 | B2 * | 9/2006 | Cheng et al. ................. 369/59.1 |
| 7,477,739 | B2 * | 1/2009 | Haitsma et al. ............... 380/201 |
| 7,516,074 | B2 * | 4/2009 | Bilobrov ....................... 704/270 |
| 7,986,913 | B2 * | 7/2011 | Wang ............................ 455/2.01 |
| 2002/0178410 | A1 * | 11/2002 | Haitsma et al. ............... 714/709 |
| 2005/0044561 | A1 * | 2/2005 | McDonald ....................... 725/18 |
| 2005/0065976 | A1 * | 3/2005 | Holm et al. ................ 707/104.1 |

(Continued)

FOREIGN PATENT DOCUMENTS

KR 10-2003-0059085 7/2003
WO 03/091990 A1 11/2003

OTHER PUBLICATIONS

Haitsma et al, "A Highly Robust Audio Fingerprinting System", International Symposium on Music Information Retrieval (ISMIR), 2002, pp. 107-115.*

(Continued)

*Primary Examiner* — Jialong He
(74) *Attorney, Agent, or Firm* — Staas & Halsey LLP (57) ABSTRACT

Provided are device, method, and medium for generating an audio fingerprint and retrieving audio data. The device for generating an audio fingerprint includes: a coefficient extracting section partially decoding audio data in a compression area and extracting MDCT (Modified Discrete Cosine Transform) coefficients; a coefficient selecting section selecting an MDCT coefficient robust to noises from the extracted MDCT coefficients; a modulation spectrum generating section transforming the selected MDCT coefficient by the use of a Fourier transform method and generating a modulation spectrum; and a bit conversion section quantizing the generated modulation spectrum and generating an audio fingerprint. As a result, it is possible to accurately and rapidly retrieve the audio data recorded in a variety of environments. Since elements based on MP3 are used, it is possible to apply to MP3 applications in various manners. In addition, it is possible to apply to classification of audio data such as classification of music moods and classification of music genres and various other fields such as extraction of a specific event from moving images of sports.

15 Claims, 4 Drawing Sheets

U.S. PATENT DOCUMENTS

2006/0075237 A1* 4/2006 Seo et al. .................. 713/176
2006/0149552 A1 7/2006 Bogdanov
2007/0055500 A1 3/2007 Bilobrov

OTHER PUBLICATIONS

Miller et al, "Audio Fingerprinting: Nearest neighbor search in high dimensional binary spaces." In IEEEWork. on Multimedia Signal Processing, 2002, pp. 1-5.*

Oostveen et al, "Feature Extraction and a Database Strategy for Video Fingerprinting", 5th International Conference on Visual Information Systems, Taipei, Taiwan, Mar. 2002, pp. 117-128.*

Haitsma et al, "Speed-change resistant audio fingerprinting using auto-correlation", Proc. Int. Conf. on Acoustics, Speech, and Sign. Proc., vol. 4, Apr. 2003, pp. 728-731.*

Lu et al, "Geometric Distortion-resilient image hashing scheme and its applications on copy detection and Authentication," ACM Multimedia Syst. J., vol. 11, Oct. 2005, pp. 159-173.*

Liu et al. "A Singer Identification Technique for Content-Based Classification of MP3 Music Objects", Proceedings of the eleventh ACM international conference on Information and knowledge management, New York, 2002.*

"Robust Audio Hashing for Audio Identification," (pp. 2091 through 2094 by Hamaza ? er et al.).

Korean Intellectual Property Office Action dated Jun. 26, 2007 and issued in corresponding Korean Patent Application No. 10-2005-0108070.

Robust Audio Hashing for Content Identification, in Proceedings of International Workshop on Content-Based Multimedia Indexing (CBMI '01), 2001, pp. 117-125, Haitsma et al.

Robust Audio Hashing for Audio Identification, EUSIPCO 2004: XII. European Signal Processing Conference, Sep. 6-10, 2004, Vienna, Austria, pp. 2091 through 2094, Hazama ? er et al.

Korean Notice of Allowance from Korean Patent Application No. 10-2005-0108070, mailed on Dec. 24, 2007.

* cited by examiner

DEVICE, METHOD, AND MEDIUM FOR GENERATING AUDIO FINGERPRINT AND RETRIEVING AUDIO DATA

CROSS-REFERENCE TO RELATED APPLICATIONS

This application claims the benefit of Korean Patent Application No. 10-2005-0108070, filed on Nov. 11, 2005, in the Korean Intellectual Property Office, the disclosure of which is incorporated herein in its entirety by reference.

BACKGROUND OF THE INVENTION

1. Field of the Invention

The present invention relates to an audio fingerprint, and more particularly, to device, method, and medium for generating audio fingerprints by extracting modulation spectrums robust to noises from audio data and retrieving audio data by the use of the generated audio fingerprints.

2. Description of the Related Art

A user uses an audio fingerprint identification technology to acquire in real time information on music output from an output unit such as a radio, a television, and an audio set.

In an audio fingerprint retrieval method by Philips®, an audio signal with a sampling rate of 5 kHz is divided into frames with a time length of 0.37 s, 11.6 ms is shifted from the respective frames, and then power spectrums are generated by the use of Fourier transform. Here, a Fourier transform band is divided into 33 frequency bands not overlapping with each other which are logarithmically in regions of 300 Hz and 2 kHz. Then, power spectrums in the respective logarithmic sub bands are summed to calculate energy. Difference in energy is calculated by a frame axis and a frequency axis, the calculated difference in energy is converted in bits, and then the bits are indexed by the use of a hashing method. However, in the audio fingerprint retrieval method by Philips®, since elements to be extracted are much affected by noises, retrieval ability for audio data recorded in noises is deteriorated and it is difficult to apply the method to a variety of environments.

In an audio fingerprint retrieval method by Fraunhofer®, first, power spectrums are generated by the use of an audio signal in the manner similar to the method by Philips®. Here, a Fourier transform band is divided into ¼ octave frequency bands in regions of 250 Hz and 4 kHz. Spectral flatness and spectral crest measure are extracted in the respective octave frequency bands to retrieve audio fingerprints. However, since the audio fingerprint retrieval method by Fraunhofer® is not resistant to noises and employs a statistical method and a vector quantization method, it has low accuracy and low retrieval speed.

SUMMARY OF THE INVENTION

Additional aspects, features, and/or advantages of the invention will be set forth in part in the description which follows and, in part, will be apparent from the description, or may be learned by practice of the invention.

The present invention provides device, method, and medium for generating audio fingerprints by extracting modulation spectrums robust to noises from audio data and retrieving audio data by the use of the generated audio fingerprints.

According to an aspect of the present invention, there is provided a device for generating an audio fingerprint, the device including a coefficient extracting section to partially decode audio data in a compression area and to extract MDCT (Modified Discrete Cosine Transform) coefficients; a coefficient selecting section to select an MDCT coefficient robust to noises from the extracted MDCT coefficients; a modulation spectrum generating section to process the selected MDCT coefficient and to generate a modulation spectrum; and a bit conversion section to quantize the generated modulation spectrum and to generate an audio fingerprint.

According to another aspect of the invention, there is provided a device for generating an audio fingerprint, the device including a coefficient extracting section to partially decode audio data in a compression area and to extract MDCT (Modified Discrete Cosine Transform) coefficients; a synthesization section to synthesize PPF (PolyPhase Filter) sub bands from the extracted MDCT coefficients; a band selecting section to select a PPF sub band robust to noises from the synthesized PPF sub bands; a modulation spectrum generating section to process the selected PPF sub band and to generate a modulation spectrum; and a bit conversion section to quantize the generated modulation spectrum and to generate an audio fingerprint.

According to another aspect of the invention, there is provided a device for retrieving audio data, the device including an audio fingerprint storage section to convert the audio data into an audio fingerprint and to store the audio fingerprint; a hashing table to store a hashing value corresponding to the stored audio fingerprint; a hashing value generating section to extract an indexing bit from the generated audio fingerprint and to generate a hashing value; a table searching section to search the hashing table for the hashing value matched with the generated hashing value; a BER calculating section to calculate a BER (Bit Error Ratio) between the generated audio fingerprint and the audio fingerprint corresponding to the searched hashing value; a comparison section to compare the calculated BER with a threshold value; and an audio fingerprint detecting section to detect the audio fingerprint in accordance with the comparison result.

According to another aspect of the invention, there is provided a method of generating an audio fingerprint, the method including partially decoding audio data in a compression area and extracting MDCT (Modified Discrete Cosine Transform) coefficients; selecting an MDCT coefficient robust to noises from the extracted MDCT coefficients; processing the selected MDCT coefficient and generating a modulation spectrum; and quantizing the generated modulation spectrum and generating an audio fingerprint.

According to another aspect of the invention, there is provided a method of generating an audio fingerprint, the method including partially decoding audio data in a compression area and extracting MDCT (Modified Discrete Cosine Transform) coefficients; synthesizing PPF (PolyPhase Filter) sub bands from the extracted MDCT coefficients; selecting a PPF sub band robust to noises from the synthesized PPF sub bands; processing the selected PPF sub band and generating a modulation spectrum; and quantizing the generated modulation spectrum and generating an audio fingerprint.

According to another aspect of the invention, there is provided a method of retrieving audio data, the method including extracting an indexing bit from the generated audio fingerprint and generating a hashing value; retrieving a hashing value matched with the generated hashing value from a hashing table storing a hashing value corresponding to an audio fingerprint stored in a storage medium; calculating a BER (Bit Error Ratio) between the generated audio fingerprint and the audio fingerprint corresponding to the retrieved hashing value; comparing the calculated BER with a threshold value; and detecting the audio fingerprint in accordance with the comparison result.

According to another aspect of the invention, there is provided a method of retrieving audio data, the method including selecting an MDCT (Modified Discrete Cosine Transform) coefficient robust to noises from MDCT coefficients extracted from audio data; processing the selected MDCT coefficient and generating a modulation spectrum; and quantizing the generated modulation spectrum and generating an audio fingerprint.

According to another aspect of the invention, there is provided a method of retrieving audio data, the method including synthesizing PPF (PolyPhase Filter) sub bands from MDCT (Modified Discrete Cosine Transform) coefficients extracted from audio data; selecting a PPF sub band robust to noises from the synthesized PPF sub bands; processing the selected PPF sub band and generating a modulation spectrum; and quantizing the generated modulation spectrum and generating an audio fingerprint.

According to another aspect of the invention, there is provided at least one medium for implementing the methods of the present invention.

BRIEF DESCRIPTION OF THE DRAWINGS

These and/or other aspects, features, and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
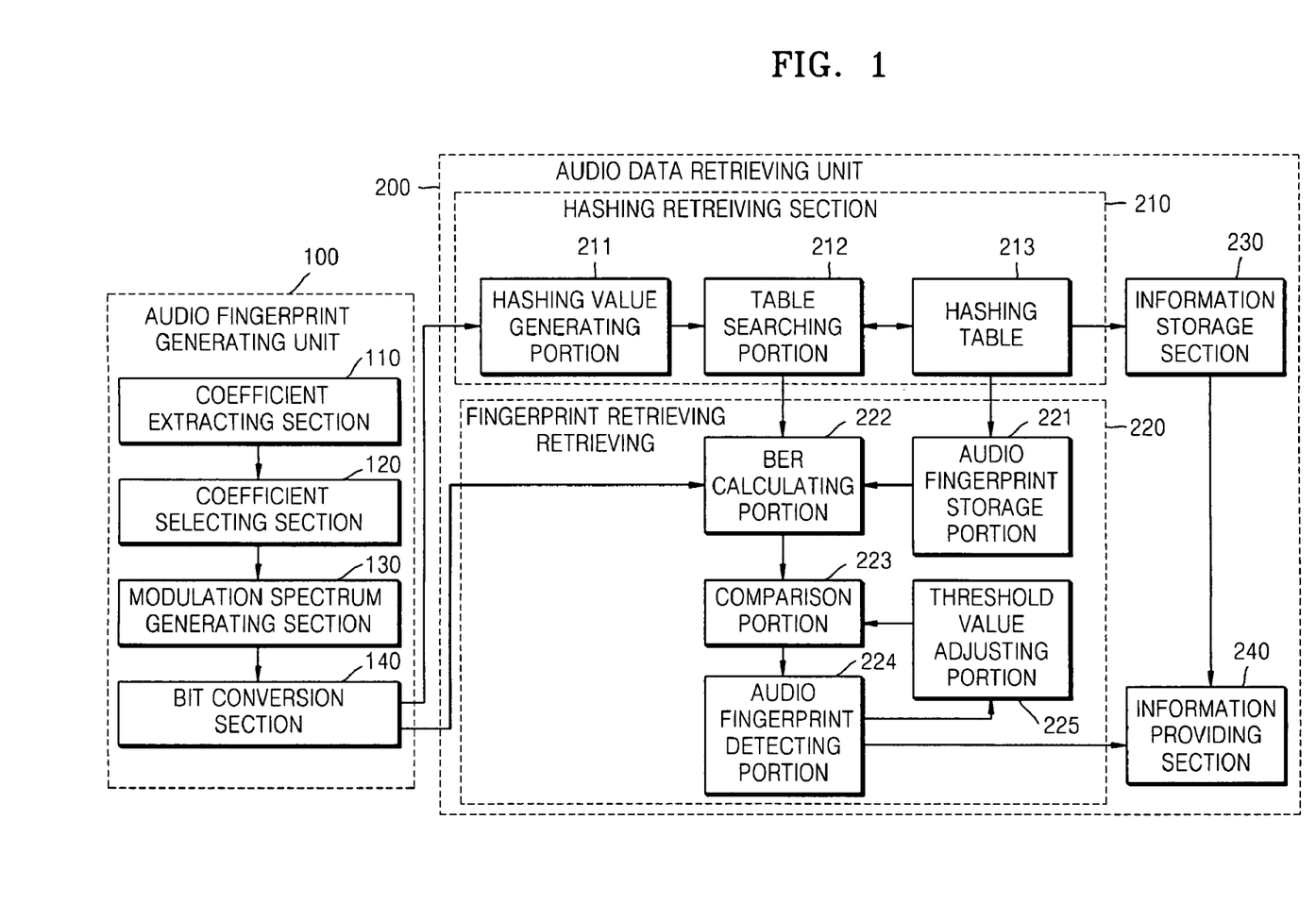
FIG. 1 is a block diagram illustrating a device for retrieving audio data according to an exemplary embodiment of the present invention.

FIG. 1 is a block diagram illustrating a device for retrieving audio data according to an exemplary embodiment of the present invention. The device for retrieving audio data includes an audio fingerprint generating unit 100 and an audio data retrieving unit 200.

The audio fingerprint generating unit 100 generates audio fingerprints from audio data which are generated by the use of a digital recording apparatus such as a mobile phone and a computer to which sounds output from an output unit such as a radio, a television, and an audio set (audio unit) are input.

The audio fingerprint generating unit 100 includes a coefficient extracting section 110, a coefficient selecting section 120, a modulation spectrum generating section 130, and a bit conversion section 140.

The coefficient extracting section 110 extracts 576 MDCT (Modified Discrete Cosine Transform) coefficients M(n,l) by partially decoding the audio data encoded in the MP3 method in a compression area. MP3 is also known as MPEG-1 Audio Layer 3, which is a standard of Moving Pictures Expert Group (MPEG). Here, MDCT (Modified Discrete Cosine Transform) is a method of transforming 576 samples from time domain signals to frequency domain signals at a time, n denotes a frame index, and l denotes a MDCT sub band index corresponding to an integer of 0 to 575.

The coefficient selecting section 120 selects an MDCT coefficient M(n,k) robust to noises from the 576 MDCT coefficients extracted by the coefficient extracting section 110. Here, k is an integer of l or less and denotes a MDCT sub band index selected by the coefficient selecting section 110.

The MDCT coefficient robust to noises selected by the coefficient selecting section 120 denotes a coefficient which is not affected much by noises and which has a stable and low bit error rate. For example, MDCT coefficients corresponding to a low frequency domain are robust to noises. It has been seen from experiment results that the first MDCT coefficient has the most stable and lowest bit error rate and the MDCT coefficients corresponding to a low frequency domain are robust to noises. Accordingly, the coefficient selecting section 120 preferably selects the MDCT coefficient corresponding to a low frequency domain.

The coefficient selecting section 120 sets the number of MDCT coefficients to be selected in accordance with data sizes of the audio fingerprints.

The modulation spectrum generating section 130 generates modulation spectrums from the MDCT coefficients M(n, k) selected by the coefficient selecting section 120 by the use of the following expression using discrete Fourier transformation (DFT).

$$Y_k(q) = \sum_{n=0}^{N-1} X_k(n) e^{-j\frac{2\pi}{N}nq}$$ Expression 1

Here, $X_k(n)=M(n,k)$ and q denotes a modulation frequency.

By performing the discrete Fourier transformation by the use of a time shift t, the modulation spectrum is expressed by the use of the following expression in the form of four dimensions including three variables.

By performing the Fourier transformation to the MDCT coefficients selected by the modulation spectrum generating section 130, it is possible to easily determine repeated tempo information which it is difficult to determine in MDCT.

$$Y_{t,k}(q) = \sum_{n=0}^{N-1} X_k(t+n) e^{-j\frac{2\pi}{N}nq}$$ Expression 2

Here, t denotes a time index.

The modulation spectrum generating section 130 may set the number of modulation frequencies to be selected in accordance with data sizes of the audio fingerprints and may determine the magnitude N of Fourier transformation in accordance with the length of the audio data.

The bit conversion section 140 quantizes the modulation spectrums generated by the modulation spectrum generating section 130 by the use of the following expression to generate audio fingerprints.

$$B_{t,k}(q) = \begin{cases} 1, & \text{if } Y_{t,k}(q+1) > Y_{t,k}(q) \\ 0, & \text{else} \end{cases}$$ Expression 3

The audio data retrieving unit 200 retrieves the audio data corresponding to the audio fingerprints generated by the bit conversion section 140 and provides a user with information on the retrieved audio data.

The audio data retrieving unit 200 includes a hashing retrieving section 210, a fingerprint retrieving section 220, an information storage section 230, and an information providing section 240.

The hashing retrieving section 210 includes a hashing value generating portion 211, a table searching portion 212, and a hashing table 213.

The hashing value generating portion 211 successively extracts indexing bits without bit error from the audio fingerprints generated by the bit conversion section 140 and generates hashing values by the use of a hashing function.

The hashing table 213 stores hashing values corresponding to addresses at which the audio fingerprints are stored in an audio fingerprint storage portion 221 and addresses at which information on the audio data is stored in an information storage section 230.

The table searching portion 212 searches the hashing table 213 for hashing values matched with the hashing values generated by the hashing value generating portion 211 and outputs the retrieved candidate audio fingerprints to a BER (Bit Error Ratio) calculating portion 222.

The fingerprint retrieving section 220 includes an audio fingerprint storage portion 221, a BER calculating portion 222, a comparison portion 223, an audio fingerprint detecting portion 224, and a threshold value adjusting portion 225.

The audio fingerprint storage portion 221 converts the audio data into the audio fingerprints and stores the audio fingerprints.

The BER calculating portion 222 calculates a BER (Bit Error Ratio) of the candidate audio fingerprints output from the table searching portion 212 and the audio fingerprints generated by the bit conversion section 140 by the use of a hamming distance.

The comparison portion 223 compares the BER calculated by the BER calculating portion 222 with the set threshold value and outputs the comparison result to the audio fingerprint detecting portion 224.

The audio fingerprint detecting portion 224 detects the audio fingerprints having a BER smaller than a predetermined threshold value in response to the comparison result of the comparison portion 223.

The threshold value adjusting portion 225 adjusts the threshold value in response to the detection result of the audio fingerprint detecting portion 224. Here, the threshold value adjusting portion 225 adjusts the threshold value, which is loosely applied to the initial comparison by the comparison portion 223, to a stricter value in accordance with the detection result of the audio fingerprint detecting portion 224. With the adjustment of the threshold value by the threshold adjusting portion 225, the audio fingerprint detecting portion 224 performs the detection process repeatedly until only one fingerprint is detected.

The information providing section 240 reads information on the audio data corresponding to the audio fingerprint detected by the audio fingerprint detecting portion 224 from the information storage section 230 and provides the read information to the user. Here, the information on the audio data may include a title of a song, a singer, a composer, and a play time.

Figure 2:
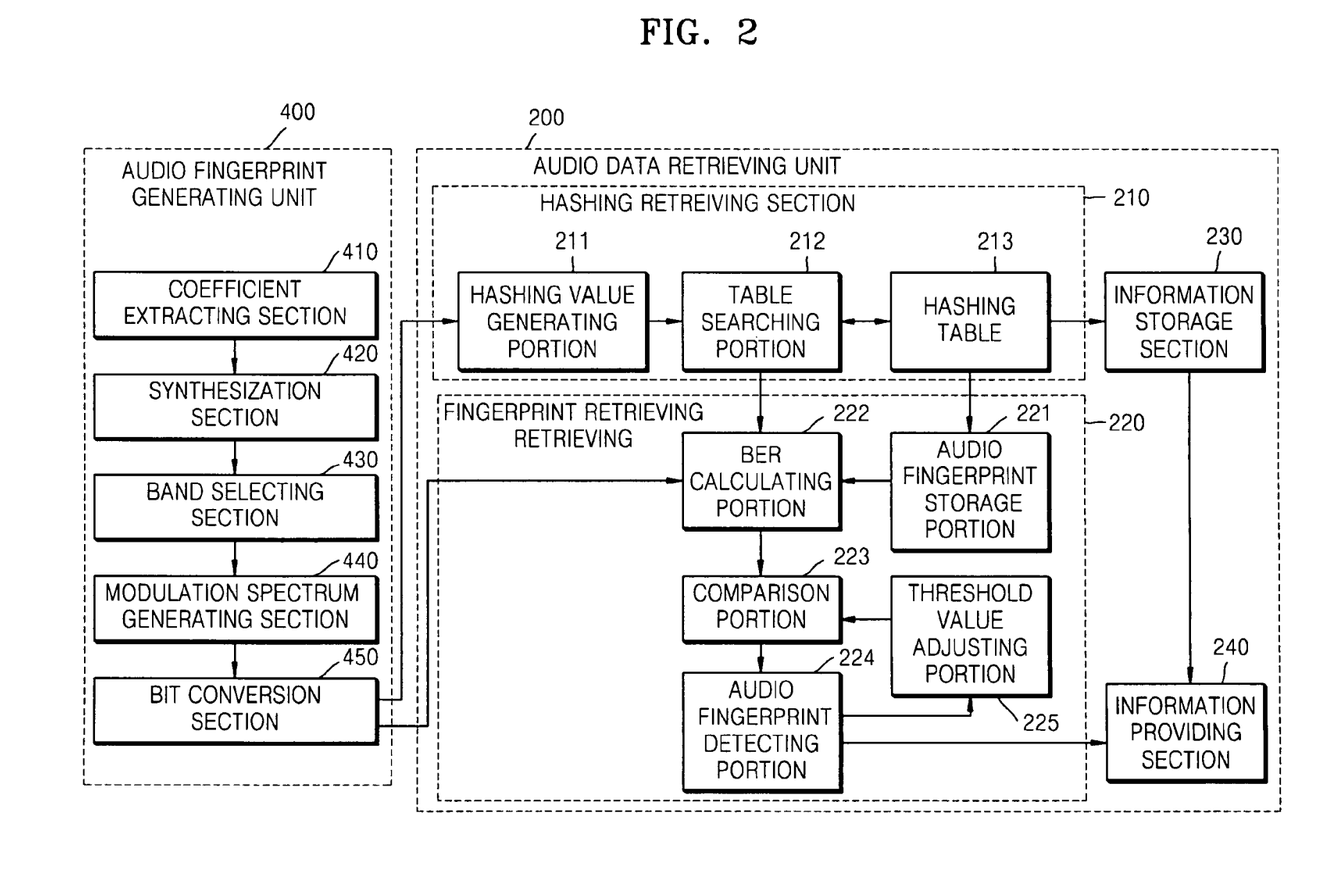
FIG. 2 is a block diagram illustrating a device for retrieving audio data according to another exemplary embodiment of the present invention.

FIG. 2 is a block diagram illustrating a device for retrieving audio data according to another exemplary embodiment of the present invention. The device for retrieving audio data includes an audio fingerprint generating unit 400 and an audio data retrieving unit 200.

The audio fingerprint generating unit 400 generates audio fingerprints from audio data which are generated by the use of a digital recording apparatus such as a mobile phone and a computer to which sounds output from an output unit such as a radio, a television, and an audio set (audio unit) are input.

The audio fingerprint generating unit 400 includes a coefficient extracting section 110, a synthesization section 420, a band selecting section 430, a modulation spectrum generating section 440, and a bit conversion section 450.

The coefficient extracting section 410 extracts 576 MDCT coefficients by partially decoding the audio data encoded in the MP3 method in a compression area.

The synthesization section 420 synthesizes 32 PPF sub bands S(n,p) robust to noises from the 576 MDCT coefficients extracted by the coefficient extracting section 410. Here, the PPF (PolyPhase Filter) method is a method used for dividing data into 32 bands in a frequency division method to process a large amount of calculation, n denotes a frame index, and p denotes a frequency index corresponding to an integer of 0 to 31.

The band selecting section 430 selects a PPF sub band S(n,o) robust to noises from the PPF (PolyPhase Filter) sub bands synthesized by the synthesization section 420. Here, o denotes a PPF sub band index selected corresponding to an integer less than p.

The PPF sub band robust to noises selected by the band selecting section 430 denotes a sub band which is not affected much by noises and which has a stable and low bit error rate. For example, the PPF sub bands corresponding to a low frequency domain are robust to noises. It has been seen from experiment results that the first PPF sub band is most stable. Accordingly, the band selecting section 430 may select the PPF sub band corresponding to a low frequency domain.

The band selecting section 430 sets the number of sub bands to be selected in accordance with data sizes of the audio fingerprints.

The modulation spectrum generating section 440 generates modulation spectrums from the PPF sub bands S(n,o) selected by the band selecting section 430 by the use of the following expression using discrete Fourier transformation (DFT).

$$Y_o(q) = \sum_{n=0}^{N-1} Z_o(n) e^{-j\frac{2\pi}{N}nq} \qquad \text{Expression 4}$$

Here, $Z_o(n)=S(n,o)$ and q denotes a modulation frequency.

By performing the discrete Fourier transformation by the use of a time shift t, the modulation spectrum is expressed by the use of the following expression in the form of four dimensions including three variables.

$$Y_{t,o}(q) = \sum_{n=0}^{N-1} Z_o(t+n) e^{-j\frac{2\pi}{N}nq} \qquad \text{Expression 5}$$

Here, t denotes a time index.

By using the Fourier transformation in the modulation spectrum generating section 440, it is possible to easily determine repeated tempo information which it is difficult to determine in PPF.

The modulation spectrum generating section 440 may set the number of modulation frequencies to be selected in accordance with data sizes of the audio fingerprints and may determine the magnitude N of Fourier transformation in accordance with the length of the audio data.

The bit conversion section 450 quantizes the modulation spectrums generated by the modulation spectrum generating section 440 by the use of the following expression to generate audio fingerprints.

$$B_{t,o}(q) = \begin{cases} 1, & \text{if } Y_{t,o}(q+1) > Y_{t,o}(q) \\ 0, & \text{else} \end{cases} \qquad \text{Expression 6}$$

The audio data retrieving unit 200 operates in the same manner as described with reference to FIG. 1.

Figure 3:
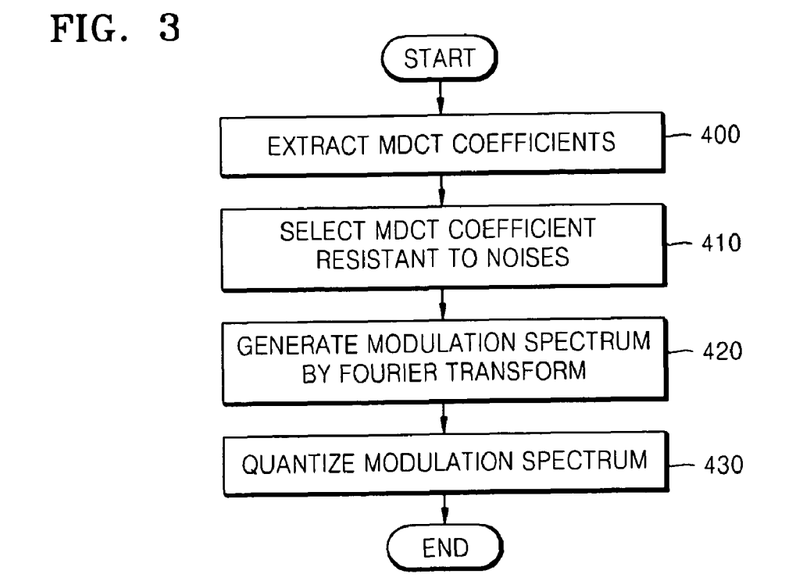
FIG. 3 is a flowchart illustrating a method of generating an audio fingerprint according to an exemplary embodiment of the present invention.

FIG. 3 is a flowchart illustrating a method of generating an audio fingerprint according to an exemplary embodiment of the present invention.

First, 576 MDCT coefficients M(n,l) are extracted by partially decoding the audio data encoded in the MP3 method in a compression area (operation 400). Here, n denotes a frame index, and l denotes a MDCT sub band index corresponding to an integer of 0 to 575.

MDCT coefficients M(n,k) robust to noises are selected from the 576 MDCT coefficients extracted in operation 400 (operation 410). Here, k is an integer of l or less and denotes a MDCT sub band index selected in operation 400.

The MDCT coefficients robust to noises selected in operation 410 mean coefficients which are not affected much by noises and which has a stable and low bit error rate. For example, the MDCT coefficients corresponding to a low frequency domain are robust to noises. It has been seen from experiment results that the first MDCT coefficient has the most stable and lowest bit error rate and the MDCT coefficients corresponding to a low frequency domain are robust to noises. Accordingly, the MDCT coefficients corresponding to a low frequency domain may be selected in operation 410.

The number of MDCT coefficients to be selected is set in accordance with data sizes of the audio fingerprints in operation 410.

The modulation spectrums are generated from the MDCT coefficients M(n,k) selected in operation 410 by the use of the following expression using discrete Fourier transformation (operation 420).

$$Y_k(q) = \sum_{n=0}^{N-1} X_k(n) e^{-j\frac{2\pi}{N}nq} \quad \text{Expression 7}$$

Here, $X_k(n)=M(n,k)$ and q denotes a modulation frequency.

By performing the discrete Fourier transformation by the use of a time shift t, the modulation spectrums are expressed by the use of the following expression in the form of four dimensions including three variables.

$$Y_{t,k}(q) = \sum_{n=0}^{N-1} X_k(t+n) e^{-j\frac{2\pi}{N}nq} \quad \text{Expression 8}$$

Here, t denotes a time index.

By using the Fourier transformation in operation 420, it is possible to easily determine repeated tempo information which it is difficult to determine in MDCT.

In operation 420, the number of modulation frequencies to be selected may be set in accordance with data sizes of the audio fingerprints and the magnitude N of Fourier transformation may be determine in accordance with the length of the audio data.

By quantizing the modulation spectrums generated in operation 420 by the use of the following expression, the audio fingerprints are generated (operation 430).

$$B_{t,k}(q) = \begin{cases} 1, & \text{if } Y_{t,k}(q+1) > Y_{t,k}(q) \\ 0, & \text{else} \end{cases} \quad \text{Expression 9}$$

Figure 4:
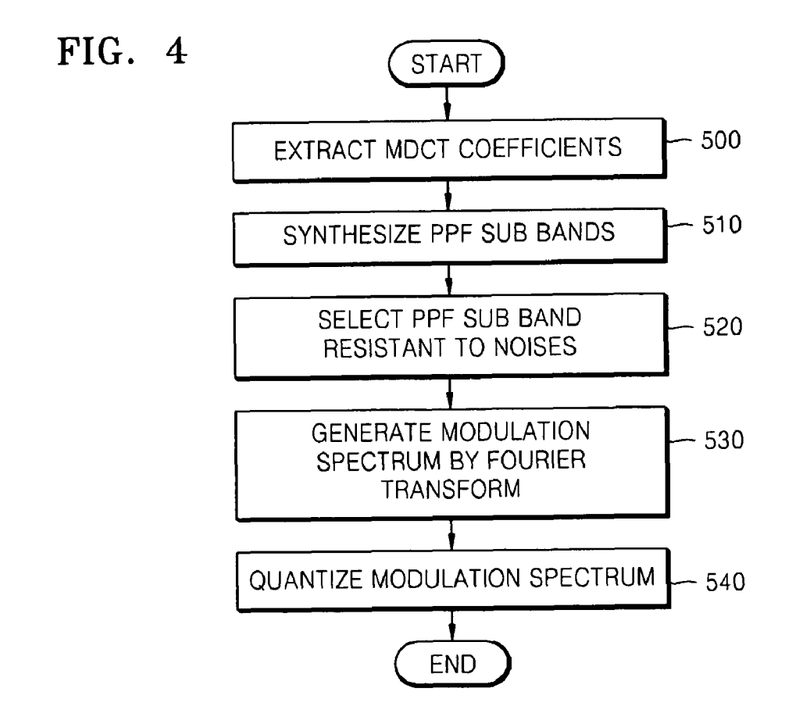
FIG. 4 is a flowchart illustrating a method of generating an audio fingerprint according to another exemplary embodiment of the present invention.

FIG. 4 is a flowchart illustrating a method of generating an audio fingerprint according to another exemplary embodiment of the present invention.

First, 576 MDCT coefficients are extracted by partially decoding the audio data encoded in the MP3 method in a compression area (operation 500).

32 PPF sub bands S(n,p) robust to noises are synthesized from the 576 MDCT coefficients extracted in operation 500 (operation 510). Here, n denotes a frame index and p denotes a frequency index corresponding to an integer of 0 to 31.

PPF sub bands S(n,o) robust to noises are selected from the PPF sub bands synthesized in operation 510 (operation 520). Here, o denotes a PPF sub band index selected corresponding to an integer less than p.

The PPF sub band robust to noises selected in operation 520 mean sub bands which are not affected much by noises and which has a stable and low bit error rate. For example, the PPF sub bands corresponding to a low frequency domain are robust to noises. It has been seen from experiment results that the first PPF sub band is most stable. Accordingly, the PPF sub bands corresponding to a low frequency domain may be selected in operation 520.

The number of sub bands to be selected is set in accordance with data sizes of the audio fingerprints in operation 520.

The modulation spectrums are generated from the PPF sub bands S(n,o) selected in operation 520 by the use of the following expression using discrete Fourier transformation (operation 530).

$$Y_o(q) = \sum_{n=0}^{N-1} Z_o(n) e^{-j\frac{2\pi}{N}nq} \quad \text{Expression 10}$$

Here, $Z_o(n)=S(n,o)$ and q denotes a modulation frequency.

By performing the discrete Fourier transformation by the use of a time shift t, the modulation spectrums are expressed by the use of the following expression in the form of four dimensions including three variables.

$$Y_{t,o}(q) = \sum_{n=0}^{N-1} Z_o(t+n) e^{-j\frac{2\pi}{N}nq} \quad \text{Expression 11}$$

Here, t denotes a time index.

By using the Fourier transformation in operation 530, it is possible to easily determine repeated tempo information which it is difficult to determine in PPF.

In operation 530, the number of modulation frequencies to be selected may be set in accordance with data sizes of the audio fingerprints and the magnitude N of Fourier transformation may be determined in accordance with the length of the audio data.

By quantizing the modulation spectrums generated in operation 530 by the use of the following expression, the audio fingerprints are generated (operation 540).

$$B_{t,o}(q) = \begin{cases} 1, & \text{if } Y_{t,o}(q+1) > Y_{t,o}(q) \\ 0, & \text{else} \end{cases} \quad \text{Expression 12}$$

Figure 5:
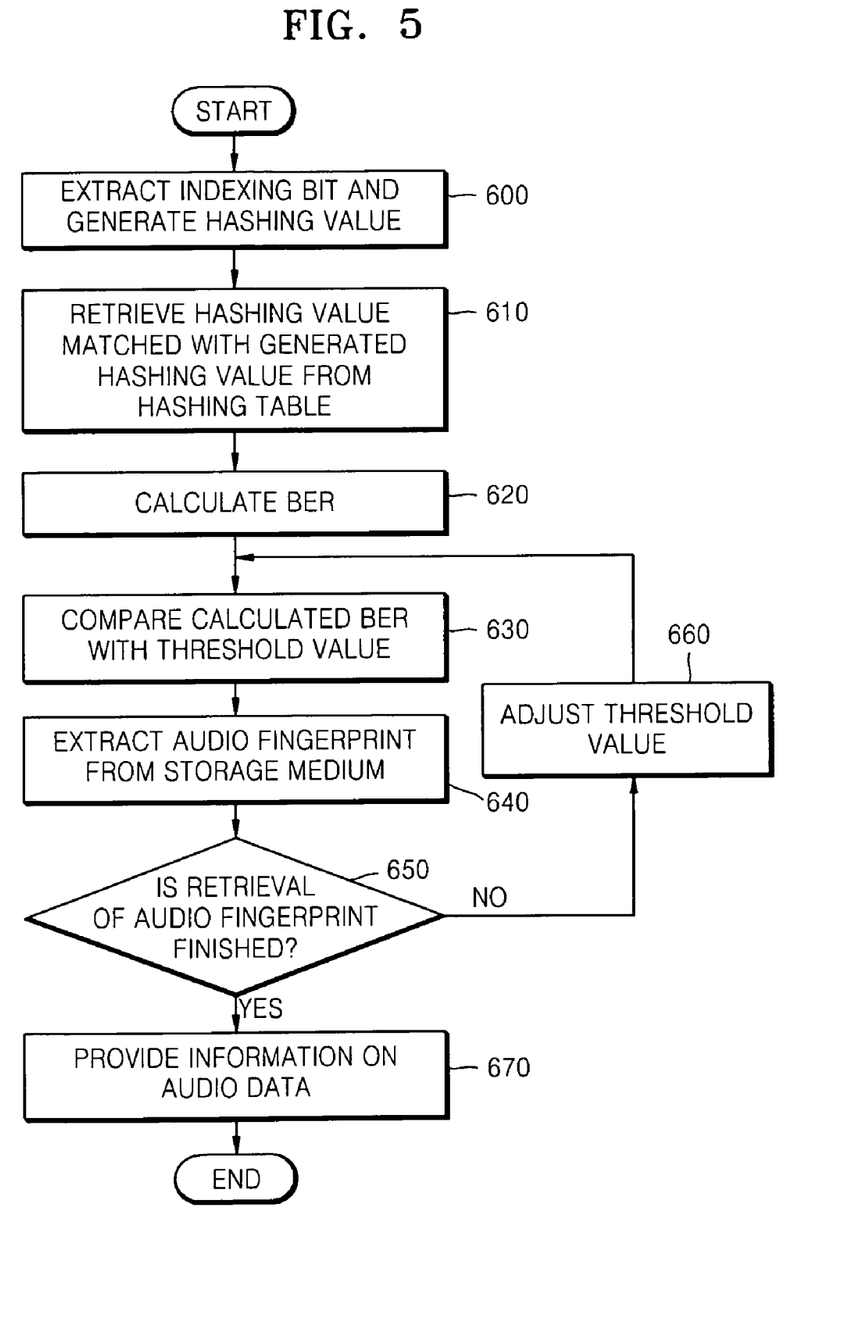
FIG. 5 is a flowchart illustrating a method of retrieving audio data according to an exemplary embodiment of the present invention.

FIG. 5 is a flowchart illustrating a method of retrieving audio data according to an exemplary embodiment of the present invention.

First, indexing bits having no continuous bit error are extracted from the audio fingerprints generated in operation 430 of FIG. 3 or in operation 540 of FIG. 4 and hashing values are generated by the use of a hashing function (operation 600).

The hashing values matched with the hashing values generated in operation 600 are retrieved from the hashing table to output retrieved candidate audio fingerprints (operation 610). Here, the hashing table stores the hashing values corresponding to the addresses at which the audio fingerprints are stored in a storage medium and the addresses at which information on the audio data is stored.

The BER of the candidate audio fingerprints output in operation 610 and the audio fingerprints generated in operation 430 of FIG. 3 or in operation 540 of FIG. 4 is calculated by the use of the hamming distance (operation 620).

The BER calculated in operation 620 is compared with a predetermined threshold value (operation 630).

The audio fingerprints having a BER smaller than the predetermined threshold value in operation 630 are detected (operation 640).

It is determined whether only one audio fingerprint is detected in operation 640 and the process of retrieving an audio fingerprint is finished (operation 650).

When it is determined in operation 650 that the process of retrieving an audio fingerprint is not finished, the threshold value is adjusted (operation 660). Here, in operation 660, the threshold value, which is loosely applied to the initial comparison in operation 630, is adjusted to stricter values in accordance with the detection result in operation 640.

The threshold value adjusted in operation 660 is compared with the BER calculated in operation 620 for the audio fingerprint detected in operation 640 (operation 630).

When it is determined in operation 650 that the process of retrieving an audio fingerprint is finished, information on the audio data corresponding to the audio fingerprint detected in operation 640 is read out from an audio database and is provided to a user. Here, the information on the audio data may include a title of a song, a singer, a composer, a lyricist, a play time, and the like.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, the code/instructions, data files, data structures, and the like may be used to provide modules, sections, or tables.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), hardware storage devices (e.g., read only memory media, random access memory media, flash memories, etc.) and storage media which may store computer readable code/instructions, data files, data structures, etc. The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA). A processor can be any device capable of executing codes/instructions.

In addition, hardware devices may be configured to act as one or more software modules, sections, or tables in order to perform the operations of the above-described exemplary embodiments.

A module, section, or table may advantageously be configured to reside on the addressable storage medium and configured to execute on one or more processors. Thus, a module, section, or table may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the modules, sections, or tables may be combined into fewer modules, sections, or tables or further separated into additional modules, sections, or tables. In addition, the modules, sections, or tables can operate at least one processor (e.g. central processing unit (CPU)) provided in a device.

The computer readable code/instructions and computer readable medium/media may be those specially designed and constructed for the purposes of the present invention, or they may be of the kind well-known and available to those skilled in the art of computer hardware and/or computer software.

In the device, method, and medium for generating an audio fingerprint and retrieving audio data according to the present invention, the audio fingerprint is generated by extracting the modulation spectrums robust to noises from the audio data and the audio data are retrieved by the use of the generated audio fingerprint.

Accordingly, it is possible to accurately and rapidly retrieve the audio data recorded in a variety of environments. Since elements based on MP3 may be used, it is possible to apply to MP3 applications in various manners. In addition, it is possible to apply to classification of audio data such as classification of music moods and classification of music genres and various other fields such as extraction of a specific event from moving images of sports. Further, although MP3 elements are discussed in exemplary embodiments, the present invention may also be applicable to other elements.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A device, including at least one storage device, for retrieving audio data, which corresponds to a first audio fingerprint, the device comprising:

an audio fingerprint storage section to store a plurality of audio fingerprints in the storage device;

a hashing table to store a plurality of hashing values corresponding to the stored audio fingerprints;

a hashing value generating section to extract an indexing bit from the first audio fingerprint and to generate a first hashing value;

a table searching section to search the hashing table for a second hashing value matched with the first hashing value;

a BER calculating section to calculate a BER (Bit Error Ratio) between the first audio fingerprint and a second audio fingerprint corresponding to the second hashing value;

a comparison section to compare the calculated BER with a threshold value; and an audio fingerprint detecting section to detect the second audio fingerprint in accordance with the comparison result, wherein the first fingerprint is generated by partially decoding an encoded input signal to extract Modified Discrete Cosine Transform (MDCT) coefficients, selecting one or more MDCT coefficients from among the extracted MDCT coefficients or one or more PolyPhase Filter (PPF) sub bands from among PPF sub bands synthesized from the extracted MDCT coefficients, generating a modulation spectrum by transforming the selected one or more MDCT coefficients or the selected one or more PPF sub bands by using a Fourier transform method, and quantizing the modulation spectrum.

2. The device of claim 1, further comprising a threshold value adjusting section to adjust the threshold value in accordance with the detection result.

3. The device of claim 1, wherein the hashing value generating section extracts the indexing bit not having a continuous bit error from the first audio fingerprint.

4. The device of claim 1, further comprising:
an information storage section to store information on a plurality of audio data corresponding to the stored audio fingerprints; and
an information providing section to read information on the audio data corresponding to the detected audio fingerprint from the information storage section and to provide the read information.

5. The device of claim 1, wherein the one or more MDCT coefficients or the one or more PPF sub bands are selected as having a stable and low bit error rate.

6. The device of claim 1, wherein the one or more MDCT coefficients or the one or more PPF sub bands are selected as corresponding to a low frequency domain.

7. The device of claim 1, wherein the number of MDCT coefficients or the number of PPF sub bands to be selected is set in accordance with the data size of the first audio fingerprint.

8. A method of retrieving audio data, which corresponds to a first audio fingerprint, the method comprising:
extracting an indexing bit from the first audio fingerprint and generating a first hashing value;
retrieving a second hashing value matched with the first hashing value from a hashing table, which stores a plurality of hashing values corresponding to a plurality of audio fingerprints stored in a storage medium, using at least one processing device;
calculating a BER (Bit Error Ratio) between the first audio fingerprint and a second audio fingerprint corresponding to the second hashing value;
comparing the calculated BER with a threshold value; and
detecting the second audio fingerprint in accordance with the comparison result,
wherein the first fingerprint is generated by partially decoding an encoded input signal to extract Modified Discrete Cosine Transform (MDCT) coefficients, selecting one or more MDCT coefficients from among the extracted MDCT coefficients or one or more PolyPhase Filter (PPF) sub bands from among PPF sub bands synthesized from the extracted MDCT coefficients, generating a modulation spectrum by transforming the selected one or more MDCT coefficients or the selected one or more PPF sub bands by using a Fourier transform method, and quantizing the modulation spectrum.

9. The method of claim 8, further comprising adjusting the threshold value in accordance with the detection result.

10. The method of claim 8, wherein in the generating the first hashing value, the indexing bit not having a continuous bit error is extracted from the first audio fingerprint.

11. The method of claim 8, further comprising: providing information on the audio data corresponding to the detected audio fingerprint to a user.

12. The method of claim 8, wherein the one or more MDCT coefficients or the one or more PPF sub bands are selected as having a stable and low bit error rate.

13. The method of claim 8, wherein the one or more MDCT coefficients or the one or more PPF sub bands are selected as corresponding to a low frequency domain.

14. The method of claim 8, wherein the number of MDCT coefficients or the number of PPF sub bands to be selected is set in accordance with the data size of the first audio fingerprint.

15. At least one non-transitory computer readable recording medium having embodied thereon a computer program for implementing a method of retrieving audio data using a processor, which corresponds to a first audio fingerprint, the method comprising:
extracting an indexing bit from the first audio fingerprint and generating a first hashing value;
retrieving a second hashing value matched with the first hashing value from a hashing table, which stores a plurality of hashing values corresponding to a plurality of audio fingerprints stored in a storage medium, using at least one processing device;
calculating a BER (Bit Error Ratio) between the first audio fingerprint and a second audio fingerprint corresponding to the second hashing value;
comparing the calculated BER with a threshold value; and
detecting the second audio fingerprint in accordance with the comparison result,
wherein the first fingerprint is generated by partially decoding an encoded input signal to extract Modified Discrete Cosine Transform (MDCT) coefficients, selecting one or more MDCT coefficients from among the extracted MDCT coefficients or one or more PolyPhase Filter (PPF) sub bands from among PPF sub bands synthesized from the extracted MDCT coefficients, generating a modulation spectrum by transforming the selected one or more MDCT coefficients or the selected one or more PPF sub bands by using a Fourier transform method, and quantizing the modulation spectrum.

* * * * *